United States Patent [19]

Steusloff et al.

[11] Patent Number: 4,739,998
[45] Date of Patent: Apr. 26, 1988

[54] BIDIRECTIONAL SEAL WITH ELLIPTICAL SEALING BARRIERS

[75] Inventors: Bradley L. Steusloff, Maybee; Frederick R. Hatch, Ann Arbor, both of Mich.

[73] Assignee: Federal-Mogul Corporation, Southfield, Mich.

[21] Appl. No.: 933,458

[22] Filed: Nov. 21, 1986

[51] Int. Cl.[4] ............................................. F16J 15/32
[52] U.S. Cl. ..................................... 277/134; 277/1; 277/152; 277/203
[58] Field of Search ................ 277/1, 134, 152, 153, 277/203, 215

[56] References Cited

U.S. PATENT DOCUMENTS

| 1,428,267 | 9/1922 | Soldane et al. | |
|---|---|---|---|
| 1,788,494 | 1/1931 | Ripley | |
| 2,188,858 | 1/1940 | Chievitz | |
| 2,446,380 | 8/1948 | Meyers et al. | 277/134 X |
| 2,606,779 | 8/1952 | Jagger | 277/134 |
| 2,742,306 | 4/1956 | Kelso et al. | |
| 2,804,325 | 8/1957 | Riesing | |
| 3,183,009 | 5/1965 | Kunel | 277/215 X |
| 3,236,532 | 2/1966 | Sale et al. | |
| 3,331,609 | 7/1967 | Moran | |
| 3,377,074 | 4/1968 | Cundy | |
| 3,801,114 | 4/1974 | Bentley | 277/134 |
| 4,118,856 | 10/1978 | Bainard et al. | |
| 4,132,421 | 1/1979 | Corsi et al. | 277/134 X |
| 4,501,431 | 2/1985 | Peisker et al. | 277/134 |
| 4,542,573 | 9/1985 | Bainard | 277/1 X |

FOREIGN PATENT DOCUMENTS

| 3221526 | 12/1983 | Fed. Rep. of Germany | 277/152 |
|---|---|---|---|
| 3327229 | 2/1985 | Fed. Rep. of Germany | 277/152 |
| 3431990 | 3/1986 | Fed. Rep. of Germany | 277/152 |
| 2167817 | 6/1986 | United Kingdom | 277/152 |

*Primary Examiner*—Robert S. Ward
*Attorney, Agent, or Firm*—Lawrence J. Shurupoff; Robert F. Hess

[57] ABSTRACT

A bidirectional shaft seal includes a plurality of concentric, radially-staggered contact surfaces arranged so as to engage a shaft along elliptical contact bands. Each contact band forms a static and dynamic barrier to prevent leakage under clockwise and couterclockwise shaft rotation. The elliptical contact may be achieved by offsetting the center of the seal lip from the axis of the shaft or by eccentrically clamping or bonding the seal lip within a seal case and mounting the seal lip concentrically with the shaft.

10 Claims, 3 Drawing Sheets

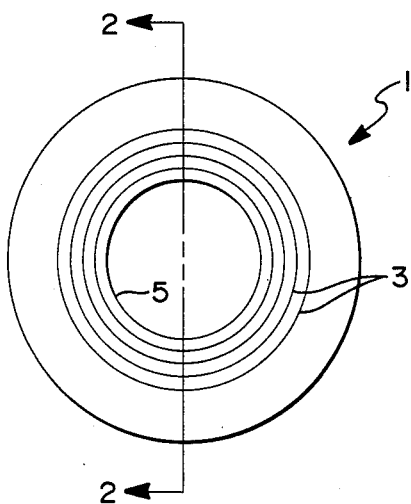
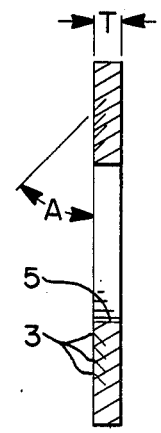
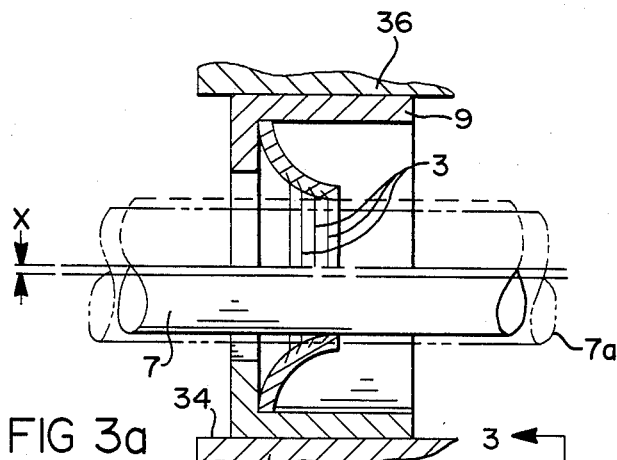
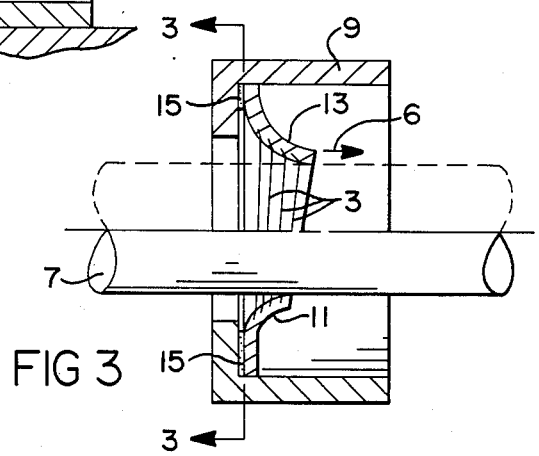

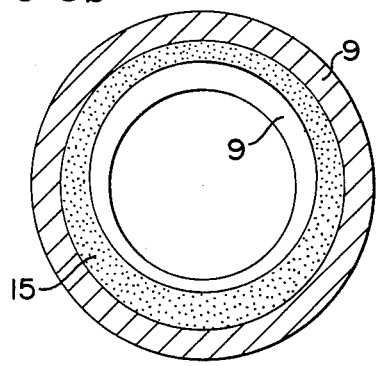
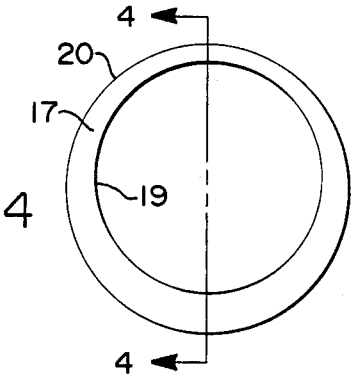
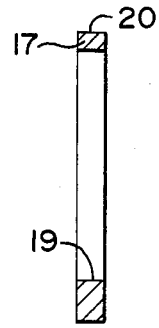
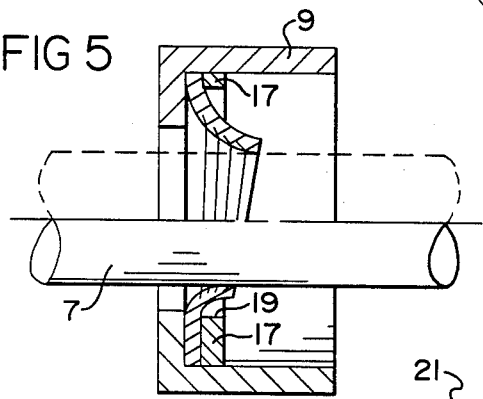
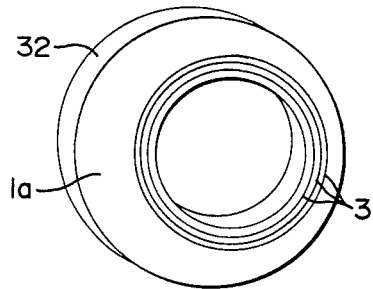
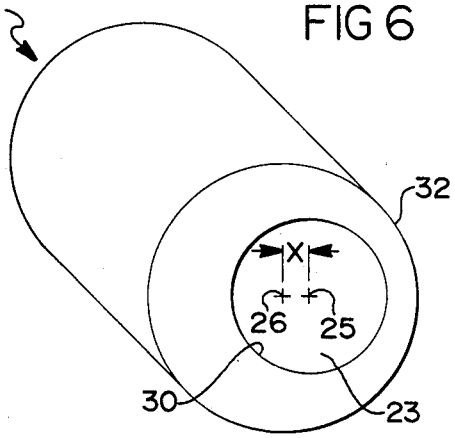

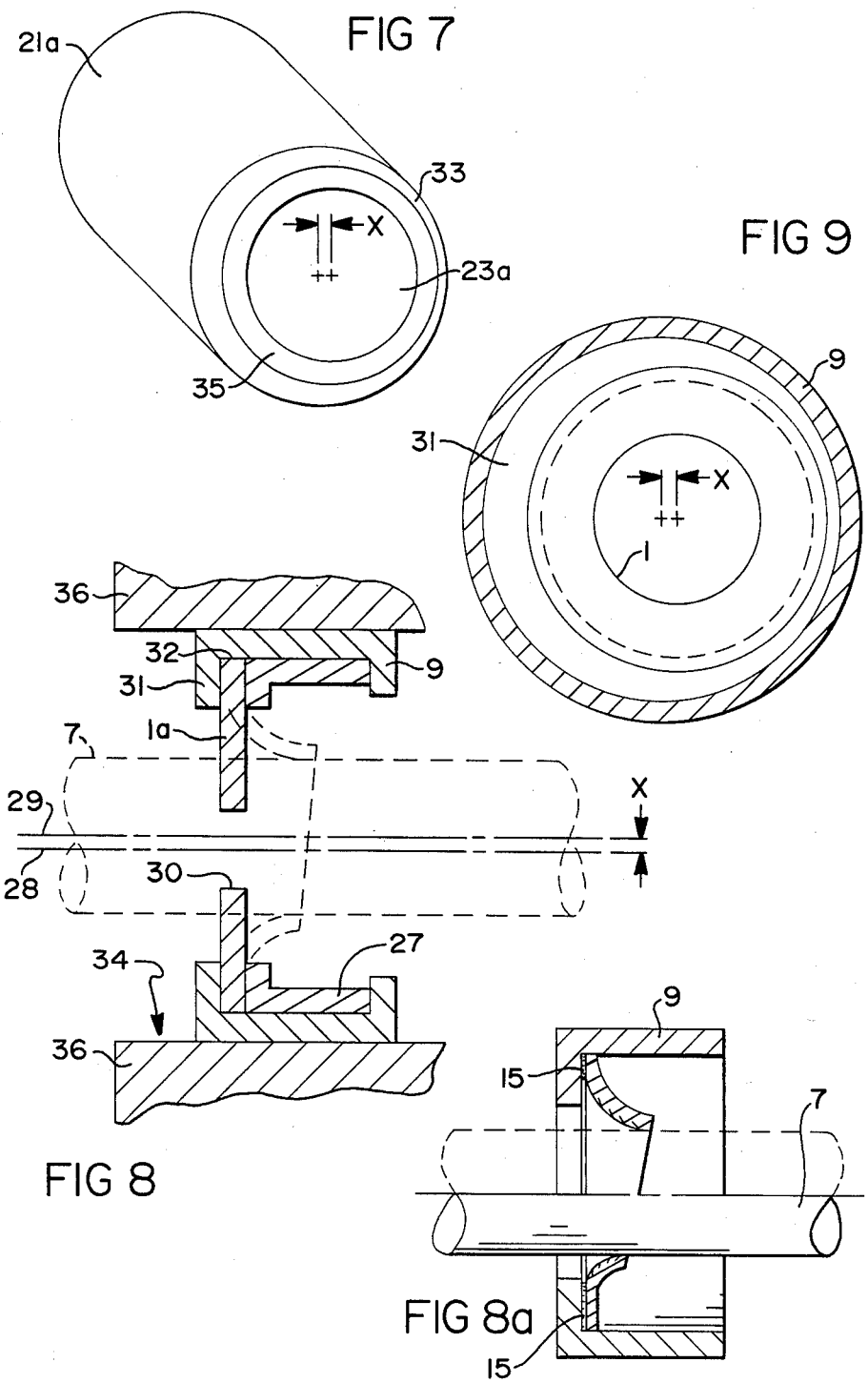

BIDIRECTIONAL SEAL WITH ELLIPTICAL SEALING BARRIERS

BACKGROUND OF THE INVENTION

1. Field of the Invention

This invention relates generally to shaft seals and particularly concerns a bidirectional shaft seal for preventing static and dynamic leakage irrespective of the direction of shaft rotation.

2. Description of Prior Developments

A leakage problem has long existed in those applications where a seal, such as an oil seal, is required to operate under bidirectional conditions. An example of a bidirectional seal application is an automotive transmission shaft seal where the transmission shaft rotates clockwise and counterclockwise depending on the direction of vehicle travel.

While conventional oil seals have performed satisfactorily under uni-directional conditions, static and dynamic oil leakage has often occurred under bidirectional operation. For example, no seal leakage may occur under strictly clockwise rotation of a shaft, while significant seal leakage may occur under counterclockwise rotation of the same shaft. Although there is no presently confirmed explanation for this phenomenon, it is possible that shaft microfinish may induce a hydrodynamic effect between the shaft and seal. This effect pumps fluids toward the inside of the seal under one direction of shaft rotation and pumps fluid toward the outside of the seal under the opposite direction of shaft rotation, the latter condition often causing a leak.

Dynamic leakage is particularly common when a seal provided with hydrodynamic pumping elements is used in a bidirectional application. Such pumping elements often include spiral flutes machined or coined in the seal lip. When the hydrodynamic seal is applied to a shaft which rotates against the seal lip so as to pump lubricant or fluid past the seal to the environment, a major leakage problem results.

A need therefore exists for a seal which may operate under bidirectional conditions yet which maintains an effective leak-proof seal at all times regardless of the direction of shaft rotation.

A need further exists for a hydrodynamic seal which maintains an effective seal during bidirectional operation.

SUMMARY OF THE INVENTION

The present invention has been developed to fulfill the needs noted above and therefor has as a primary object the provision of a bidirectional shaft seal which maintains an effective seal under clockwise and counterclockwise shaft rotation. One solution to the bidirectional leakage problem is to form a plurality of concentric grooves or ridges in the face of a lip seal so as to create a plurality of static and dynamic "dams" which present multiple sealing barriers to the sealed fluid. A preferred solution is to form the grooves and ridges on an annular polymeric wafer and eccentrically arrange the wafer within a casing so as to form an elliptical or "wave" contact pattern between the wafer and shaft.

It is therefore an object of the invention to provide a bidirectional seal for use with reversing shaft applications.

Another object is to provide a polymeric bidirectional seal having a series of concentric ridges or grooves formed on a sealing lip for maintaining an effective seal regardless of the direction of shaft rotation.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein:

FIG. 1 is an axial end view of a lip seal wafer provided with concentric grooves;

FIG. 2 is a sectional side elevation view of the wafer taken along line II—II of FIG. 1;

FIG. 3 and 3a are sectional side views of the wafer of FIGS. 1 and 2 respectively mounted eccentrically and concentrically within a casing and applied to a shaft;

FIG. 3b is a sectional axial end view of the casing taken along line III—III of FIG. 3 showing the adhesive pattern for eccentrically bonding the wafer to the casing;

FIG. 4 is an axial end view of an inner case element formed with an eccentric bore;

FIG. 4a is a sectional view of the inner case element taken through line IV—IV of FIG. 4;

FIG. 5 is an axial sectional view through a seal fitted with the inner case element of FIG. 4 and applied to a shaft;

FIG. 6 is a perspective view of a billet from which polymeric seal wafers may be cut;

FIG. 6a is a perspective view of a wafer cut from the billet of FIG. 6 and provided with concentric grooves;

FIG. 7 is a perspective view of a composite billet from which modified composite material seal wafers may be cut;

FIG. 8 is an axial sectional view through a seal provided with a wafer formed from the billet of FIGS. 6 or 7 and clamped to the case;

FIG. 8a is an axial sectional view through a seal provided with a wafer formed from the billet of FIGS. 6 or 7 and bonded to the case; and FIG. 9 is a sectional end view of a concentric wafer bonded eccentrically to a seal case.

DETAILED DESCRIPTION OF THE PREFERRED EMBODIMENTS

The invention will now be described in conjunction with the drawings, beginning with FIGS. 1 and 2 which show an annular wafer 1 provided with a series of concentric grooves 3. The grooves form a plurality of axially separated sealing contact surfaces when fitted within a seal case and applied to a shaft as seen in FIGS. 3 and 3a. The wafer 1 which acts as a seal lip is preferably formed of a polymeric material such as polytetrafluoroethylene or perfluoroalkoxy. Fillers may be added to the wafer material to specifically adapt the wafer for its intended use. Filler materials include glass fibers, molybdenum disulfide, graphite and bronze.

The concentric grooves 3 preferably are radially staggered across the face of the wafer up to its inner diameter 5. The inner diameter 5 is dimensioned smaller than the outer diameter of the shaft to which the seal is applied so that the wafer must be stretched over the shaft. This stretching causes the wafer to lay down on the shaft as seen in FIG. 3 so that multiple annular continuous contact surfaces are formed between the wafer and shaft. The contact surfaces are separated by the grooves 3 which may be machined or coined in the face of the wafer using conventional techniques. Each annular contact surface or contact band forms a barrier or dam to resist the passage of fluid past the wafer. This series of annular barriers forms a highly effective seal under reversing shaft applications.

The grooves are preferably machined at an angle A with respect to the face of the seal, as seen in FIG. 2. Angle A should be maintained within a range of 10° to 170° and preferably within a range of 30° to 70°. The depth of the grooves may vary between 5% and 85% of wafer thickness T with a preferred depth of 30% to 70% of the wafer thickness. The wafer thickness may range from 0.001 inch to 0.250 inch with a preferred range of 0.20 inch to 0.065 inch.

While an effective bidirectional seal is formed with the wafer 1 mounted concentrically within a seal case and applied to a shaft so that the grooves 3 are disposed substantially perpendicular to the axis of the shaft 7 as in FIG. 3a, a preferred arrangement is shown in FIG. 3 wherein grooves 3 form a series of elliptical contact surfaces with the shaft. It has been found that by arranging an axially staggered series of sealing contact surfaces at an acute angle with respect to the axis of the shaft, a highly effective bidirectional seal results. It is possible that a slight hydrodynamic effect may be created by the elliptical contact bands shown in FIG. 3 such that fluid or lubricant is pumped axially inwardly along arrow 6 under both clockwise and counterclockwise shaft rotation.

As further seen in FIG. 3, the wafer 1 of FIG. 1 is eccentrically bonded to seal case 9 so that a small radius bend 11 is formed diametrically opposite a large radius bend 13. The eccentric bonding pattern may be applied to case 9 with the aid of a template to form the adhesive pattern depicted in FIG. 3b, which shows the case treated with adhesive 15 prior to bonding of the wafer 1.

Another manner of forming multiple elliptical contact sealing surfaces is shown in FIGS. 4, 4a and 5 wherein an annular inner case clamping element 17 is formed with a circular inner diameter 19 offset or eccentrically disposed with respect to its outer diameter 20. When the concentric wafer of FIG. 1 is clamped within the outer case 9 with clamping element 17, the same elliptical lay down pattern is formed between the wafer and shaft in FIG. 5 as is formed in FIG. 3. The sole difference between the embodiments of FIGS. 3 and 5 is that contact between the wafer and case is maintained by an eccentric adhesive pattern in FIG. 3 and by an eccentric mechanical clamping element in FIG. 5.

A somewhat modified wafer may be formed from the polymeric tubular billet 21 shown in FIG. 6. By molding or machining a circular channel 23 within the billet and offsetting the center 25 of the channel a distance X from the center 26 of the billet, a wafer 1a as shown in FIG. 6a may be sliced from the billet and either concentrically bonded or concentrically clamped within a seal case to obtain an elliptical contact with the shaft. Concentric grooves are preferably formed within the face of the wafer as described above.

The lay down pattern of the wafer or seal lip of FIG. 6a upon the shaft is shown in phantom in FIG. 8. An advantage of this type of wafer is gained through simplicity of assembly. That is, as shown in FIG. 8, a standard concentric annular inner case element 27 may be used to mount wafer 1a, as cut from billet 21, within a standard concentric outer case 9. Alternately, wafer 1a may be concentrically bonded directly to outer case 9 as shown in FIG. 8a with a concentric or cylindrical adhesive bonding pattern. No eccentric inner case element such as shown in FIG. 4 is required for the seal of FIG. 8 since the wafer provides its own eccentricity. Moreover, no adhesive template is required to form an eccentric bond pattern for the seal of FIG. 8a since the outer diameter of wafer 1a nests concentrically within the case 9 and the entire inner surface of the radial flange 31 may be coated with adhesive. The inner case 27 and outer case 9 may be concentrically mounted within a bore 34 formed within a conventional seal housing 36. Lip 1a is shown in phantom as stretched over shaft 7. The shaft is mounted concentrically within the bore 34 and aligned concentrically with respect to the inner and outer cases. The offset X between the centerline or axis 29 of shaft 7 and the center 28 of the inner diameter 30 of the wafer 1a corresponds to the offset X shown in FIG. 6. This offset results in elliptical contact between the wafer and shaft.

A further modified billet and wafer is shown in FIG. 7. While the channel 23a may be offset from the axis of billet 21a as in FIG. 6 so as to form eccentric wafers such as wafer 1a in FIG. 6a, a completely concentric billet may also be molded to form a wafer similar to that shown in FIG. 1. What is different about the wafers formed from billet 21a is that two separate billet materials are used. An outer tubular portion 33 formed of thermoplastic or thermosetting materials such as rubber or phenolic materials is bonded either concentrically (not shown) or eccentricaly (as in FIG. 7) around an inner tubular polymeric portion 35 preferably formed of polytetrafluoroethylene. The advantage of using wafers cut from billet 21a is that the portion 33, preferably a rubber material, bonds to the outer case 9 much more readily than polymeric portion 35. By bonding the rubber directly to the case, no chemical etching is required (as is the case for a totally polymeric wafer) before the wafer may form a suitable adhesive bond with the case.

The amount of offset X between the center of the wafer bore and the center of the seal case, which in use translates into the offset between the center of the wafer bore or wafer inner diameter and the center of the shaft, should be maintained between 0.001 inch and 1.00 inch. Stated another way, the elliptical lay down pattern formed between the wafer and shaft is achieved by offsetting the center of the inner diameter of the wafer between 0.001 inch and 1.00 inch from the axis of the shaft. The optimum offset is determined empirically but is usually a function of the shaft diameter.

A particularly effective and simple manner of forming an elliptical contact between the wafer and shaft using a completely concentric seal mounted concentrically within a bore such as shown in 3a is to offset the center of the seal mounting bore with respect to the axis of the shaft such as by mounting the shaft eccentrically within the bore. This offset is represented in phantom in FIG. 3a wherein shaft 7a is lowered or offset an amount X. This will result in an elliptical contact between the wafer and shaft such as shown in FIG. 3.

Another manner of generating elliptical contact between a seal lip wafer and a shaft using all concentric components is to mount a wafer 1 within a casing, either by clamping or bonding the wafer eccentrically within the casing. This is shown in FIG. 9, wherein circular wafer 1 is bonded or glued to circular case 9 over the entire overlap or interface between the wafer and the case with the center of the wafer offset by an amount X from the center of the case. The inner diameter of the case 9 is shown in phantom to clarify the mounting arrangement.

Obviously, numerous modifications and variations of the present invention are possible in light of the above teachings. It is therefore to be understood that within the scope of the appended claims, the invention may be practiced otherwise than as specifically described herein. For example, thermosetting, thermoplastic or rubber materials may be substituted for the polymeric wafer material specified without departing from the invention.

What is claimed is:

1. A bidirectional shaft seal, comprising:
   an annular case element having a circular outer diameter;
   an annular seal lip wafer mounted to said case element, said seal lip having a circular inner diameter arranged eccentricaly with respect to said outer diameter of said case element such that said inner diameter of said seal lip, as installed on shaft, maintains at least one continuous elliptical band of contact with said shaft.

2. The seal of claim 1, wherein said seal lip comprises an annular wafer formed of a polymeric material.

3. The seal of claim 1, wherein said seal lip comprises a plurality of annular grooves formed therein for forming a plurality of eccentric bands around said shaft.

4. A bidirectional shaft seal, comprising:
   a case element; and
   a seal lip mounted to said case element, said seal lip having a plurality of concentric contact surfaces formed therein for elliptically engaging a shaft such that a plurality of elliptical sealing barriers is formed by continuous contact between said contact surfaces and said shaft.

5. The seal of claim 4, wherein said seal lip comprises an annular wafer formed of a polymeric material.

6. A bidirectional shaft seal, comprising:
   an annular case element having a circular outer diameter;
   an annular seal lip wafer clamped to said case element, said seal lip having a circular inner diameter arranged eccentricaly with respect to said outer diameter of said case element such that said inner diameter forms at least one elliptical contact band around a shaft; and
   an eccentric clamping element operatively associated with said case element for clamping said seal lip wafer to said case element.

7. A bidirectional shaft seal, comprising:
   an annular case element having a circular outer diameter;
   an annular seal lip wafer bonded to said case element, said seal lip having a circular inner diameter arranged eccentricaly with respect to said outer diameter of said case element such that said inner diameter forms at least one elliptical contact band around a shaft; and
   an adhesive applied to said case element with an eccentric pattern for bonding said seal lip wafer to said case element.

8. A bidirectional shaft seal, comprising:
   a case element;
   a seal lip clamped to said case element, said seal lip having a plurality of concentric contact surfaces formed therein for elliptically engaging a shaft such that a plurality of elliptical sealing barriers are formed between said contact surfaces and said shaft; and
   an eccentric clamping element for clamping said seal lip to said case element.

9. A bidirectional shaft seal, comprising:
   a case element;
   a seal lip bonded to said case element, said seal lip having a plurality of concentric contact surfaces formed therein for elliptically engaging a shaft such that a plurality of elliptical sealing barriers are formed between said contact surfaces and said shaft; and
   an adhesive applied to said case element with an eccentric pattern for bonding said seal lip to said case element.

10. A method for forming a bi-directional shaft seal between an annular seal lip and a shaft disposed within a seal housing bore, comprising:
   mounting a shaft within said seal housing bore;
   mounting said seal lip within said seal housing bore such that the axis of said shaft is radially offset from the center of said seal lip, thereby forming at least one elliptical contact sealing band between said seal lip and said shaft; and
   maintaining continuous elliptical contact between said seal lip and said shaft to form a continuous elliptical sealing barrier between said seal lip and said shaft.

* * * * *